United States Patent [19]
Sawakura et al.

[11] Patent Number: 5,704,225
[45] Date of Patent: Jan. 6, 1998

[54] REGENERATOR

[75] Inventors: Kazuya Sawakura, Ohta; Masayuki Oonou; Sumio Ikeda, both of Ohra-gun, all of Japan

[73] Assignee: Sanyo Electric Co., Ltd., Osaka-fu, Japan

[21] Appl. No.: 757,504

[22] Filed: Nov. 27, 1996

[51] Int. Cl.⁶ ................................................ F25B 33/00
[52] U.S. Cl. ............................................................ 62/497
[58] Field of Search ................................ 62/497, 476, 494; 122/13.1, 188, 406.5, 451.5

[56] References Cited

U.S. PATENT DOCUMENTS

| | | | |
|---|---|---|---|
| 4,106,309 | 8/1978 | Phillips | 62/476 |
| 5,435,154 | 7/1995 | Nishiguchi et al. | 62/476 |
| 5,544,497 | 8/1996 | Inoue | 62/497 |

FOREIGN PATENT DOCUMENTS 725571  6/1995  Japan .

*Primary Examiner*—William Doerrler
*Attorney, Agent, or Firm*—Weingarten, Schurgin, Gagnebin & Hayes LLP

[57] ABSTRACT

It is an objective of the present invention to improve the response performance of absorption refrigeration machine to changes in air-conditioning load by reducing irregularity in solution concentration. A spreader 34 is provided with openings 34a having a constant diameter, and these openings are positioned or aligned in such a manner that the concentration of the openings 34a is rare on one side of the spreader but dense on the other side. The side having the rare concentration of the openings 34a is placed to the lateral wall 1a of a vessel 1 in which a solution outlet 16 is provided. The side having the dense concentration is placed to the other lateral wall 1b of the vessel 1. The spreader 34 is placed at the position where it is slightly away from the solution outlet 16 toward a front wall 1c in a vapor portion of an evaporation-separative region 19, with the bottom plate of the spreader being horizontal. The spreader 34 is provided with supply means 35, which extends parallel to and equidistant from the lateral walls 1a and 1b of the vessel 1. With this supply means, the solution which has absorbed a refrigerant at an absorber is supplied to the longitudinally central portion of the spreader.

3 Claims, 8 Drawing Sheets

(a)

(b)

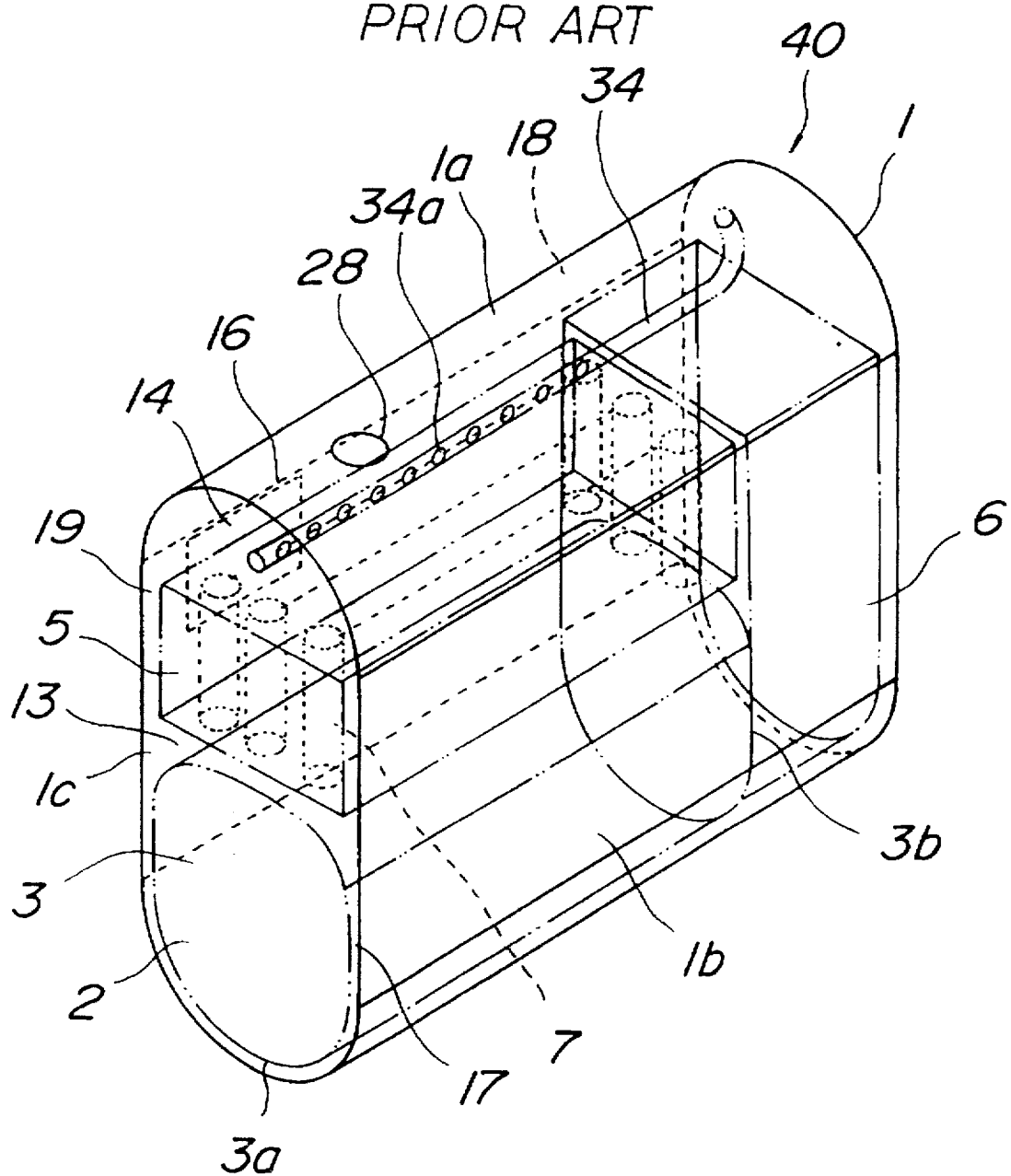

1

REGENERATOR

BACKGROUND OF THE INVENTION

1. Field of the Invention

The present invention relates to a regenerator of an absorption refrigeration machine.

2. Background Art

Japanese Utility-Model Publication No. H7(1995)-25571, for example, discloses a double-utility absorption refrigeration machine, which uses water ($H_2O$) as a refrigerant and an aqueous solution of lithium bromide (LiBr) as the absorbing medium (solvent). The construction of this machine is shown in FIG. 3. In this double-utility absorption refrigeration machine, the refrigerant which has evaporated at a high-temperature regenerator 40 enters a low-temperature regenerator 50 through a refrigerant pipe 81. Then, it enters a condenser 60, where heat-transfer takes place between the refrigerant and the water flowing through a cooling water pipe 82. The refrigerant after condensing into liquid flows into an evaporator 70 through a refrigerant pipe 83. There, it evaporates again in heat exchange with the water flowing through a cold water pipe 84. As a result, the water in the pipe 84 is cooled by the heat of evaporation absorbed by the refrigerant. The refrigerant evaporating in the evaporator 70 enters an absorber 80 and absorbed in the solvent, i.e., the aqueous solution of lithium bromide (hereinafter referred to as "solution") which is sprayed from above. This solution, which has been diluted from the absorption of the refrigerant, is supplied through an absorption solution pipe 86, a low-temperature heat exchanger 87 and a high-temperature heat exchanger 88 to the high-temperature regenerator 40 by the operation of an absorption solution pump 85. The solution in the high-temperature regenerator 40 is heated by a burner 4, and the refrigerant is evaporated. When the solution has achieved a medium concentration from this evaporation, it enters the low-temperature regenerator 50 through an absorption solution pipe 89, the high-temperature heat exchanger 88 and an absorption solution pipe 90. There, the solution is heated by the refrigerant steam flowing from the high-temperature regenerator 40 through the refrigerant pipe 81, and it achieves a still higher concentration through evaporation of the refrigerant. The temperature of this denser solution decreases as the solution goes through an absorption solution pipe 91, the low-temperature heat exchanger 87 and an absorption solution pipe 92. Upon reaching the absorber 80, the solution is sprayed downward. A refrigerant pump 93 is provided in a refrigerant pipe 94 so that the refrigerant liquid which has been collected in a refrigerant collector of the evaporator 70 is sprayed onto the portion of a cold water pipe in the evaporator 70.

As a regenerator 40 used in such double-utility absorption refrigeration machine, Japanese Patent Publication No. H7(1995)-54219, for example, discloses a regenerator which has the construction shown in FIGS. 4 through 7. The body 1 (hereinafter referred to as "vessel") of this regenerator is shown in FIG. 1. In the lower portion of the vessel, a furnace 3, which is elongated horizontally to form a combustion chamber 2, is provided with a predetermined clearance from the wall of the vessel. A burner 4 is provided facing the combustion chamber 2 on the vessel 1, and an exhaust passage 5 is formed above the combustion chamber 2. This exhaust passage is connected to a furnace back chamber 6, which is provided behind the combustion chamber 2, and many solution tubes 7 are placed vertically in the exhaust passage, for example, in a zigzag manner.

2

As a result, solution portions 8-15, which are connected one after another, exist in the vessel 1. The solution portion 14 is a portion defined between a solution outlet 16, which is provided in the vessel wall above the solution tubes 7, and the upper ends of the solution tubes 7. The solution portions 15 are portions inside the solution tubes 7, which connect the solution portion 14 to the solution portion 13. The solution portions 10, 11 and 12 define a heat-convective region 17, which has a vertical cross section of "U" figure. Above this heat-convective region 17, provided is an evaporation-separative region 19 consisting of the solution portions 13, 14 and 15 and a vapor portion 18.

A smoke chamber 20 with a chimney 20a is connected to the exhaust passage 5, and guide plates 21, 22, 23, 24 and 25 are provided downward on the upper inside wall of the exhaust passage 5 in such a manner that the upper the location of the guide plate in the upstream direction the smaller the height of the guide plate.

A solution inlet 26 is provided in the top of the vessel 1, and a steam chest 27 is provided on the upper portion of the vessel 1. A discharge slot 28 is open in the steam chest for discharging the refrigerant steam. Furthermore, a pedestal 29 supports the vessel 1.

As shown in FIG. 5, a seat 30 is provided for mounting the burner 4. A steam pipe 32 is connected to the discharge slot 28 for discharging the refrigerant steam and a solution pipe 31 is connected to the solution inlet 26 for pouring the solution as shown in FIGS. 5 and 6. Also, a lid 33, which is removable, is provided to the smoke chamber 20 as shown in FIGS. 5 and 7.

In this high-temperature regenerator 40 of the above described construction, exhaust gas moving through the exhaust passage 5 flows lower along the guide plates 21–25 as it flows in the downstream direction during the heating process of the system. Therefore, the amount of heat transferred from the exhaust gas to the solution is larger at the lower portions of the solution tubes 7 which are located down stream in the exhaust passage 5. The solution with bubbles of steam, which is generated from the boiling of the solution heated in this process, flows upward in the solution tubes 7, i.e., from the lower portions to the upper portions of the solution portions 15. The solution is agitated by the convection current existing in the evaporation-separative region 19 defined by the solution portions 15 and the solution portions 13 and 14. In this way, an effort is made to uniform the lithium bromide concentration in the solution in the evaporation-separative region 19.

In the above high-temperature regenerator 40, the solution is heated in the vessel 1 by the flames ignited by the burner 4 in the combustion chamber 2 and the remaining heat in the exhaust gas. In this case, however, the flames extend rearward, and the temperature of the solution becomes highest near the furnace back chamber 6, where the exhaust gas returns to the exhaust passage 5. As a result, a strong convection current flows upward therefrom, evaporating and separating the refrigerant steam. To the center of this portion, cold solution is poured in from the solution inlet 26 to lower the temperature of the solution. This causes a problem. As the convection current becomes turbulent, the solution at a low temperature with a high concentration of the refrigerant directly discharges from the solution outlet 16.

To solve this problem, the high-temperature regenerator 40 is constructed, for example, with a spreader 34, which is provided parallel to and equidistant from the longitudinal side walls 1a and 1b of the vessel 1, in the vapor portion 18 above the evaporation-separative region 19 as shown in FIG. 8. In this construction, the solution is supplied through the spreader 34 so that the solution is supplied more to the front side near the seat for the burner 4, where the heating of the solution takes relatively little. The solution poured in flows downward in convection in the portion near the seat of the burner 4, and it flows upward with bubbles generated in the portion near the furnace back chamber 6, where large part of the heating of the solution takes place. Then, the solution flows forward through the solution portion 14 in convection, and it discharges from the solution outlet 16 after achieving a high concentration.

However, because the high-temperature regenerator shown in FIG. 8 attempts to pour the solution evenly to the center of a reservoir portion with the spreader positioned parallel to and equidistant from both the side walls of the vessel, the mixing of the solution by means of convection circulation is not sufficiently achieved. The resulting irregularity in the solution concentration slows the response of the machine to changes in the load of air-conditioning. This has been a problem.

SUMMARY OF THE INVENTION

The present invention is to solve the above problem of the prior art by providing three types of construction to a regenerator. This regenerator has a vessel which contains a furnace and an exhaust passage. The furnace extends horizontally, and the exhaust passage extends from an rear end of the furnace horizontally above the furnace. This vessel further includes a plurality of solution tubes, which penetrate the exhaust passage vertically. In the vessel, defined are a heat-convective region with a vertical cross section of "U" figure and an evaporation-separative region, which is located above this heat-convective region. Into this vessel, the solution which has absorbed the refrigerant at an absorber is poured through a spreader, which is provided in an vapor portion of the evaporation-separative region. This solution in the vessel is heated by the flame generated in the furnace and by the exhaust gas discharged through the exhaust passage. As a result, the refrigerant is evaporated and separated from the solution and discharged, and the solution with a reduced refrigerant concentration after the evaporation of the refrigerant is discharged from a solution outlet.

In a first construction for this regenerator, the spreader which is formed to spray one amount of the solution near one lateral wall of the vessel and a different amount of the solution near the other lateral wall of the vessel is placed near a front end of the furnace. Furthermore, the solution outlet is positioned near the spreader to the side of the rear end of the furnace in the lateral wall whose side the smaller amount of the solution is sprayed to.

In a second construction for the above regenerator, the spreader is formed with spray openings which are directed to one lateral wall of the vessel. Furthermore, the solution outlet is positioned near the spreader to the side of the rear end of the furnace in the other lateral wall of the vessel.

In a third construction for the above regenerator, the spreader is provided with one opening area to the side of one lateral wall of the vessel and a different opening area near the other lateral wall of the vessel. Furthermore, the solution outlet is positioned near the spreader to the side of the rear end of the furnace in the lateral wall whose side the smaller opening of the spreader is located on.

While the solution is sprayed from the spreader, the solution retained in the heat-convective region and the evaporation-separative region is heated by the heat from the flame generated by, e.g., a burner in the space between the front end and the rear end of the furnace and by the heat in the exhaust gas. The temperature of the solution becomes highest near the rear end of the furnace, which is heated by the flame and the exhaust gas turning in discharge, and it becomes lowest below the spreader. As a result, the solution flows upward near the rear end of the furnace and downward near the front end of the furnace, thereby creating a strong convection current.

The solution is poured more to the side of the lateral wall with no solution outlet than to the side of the lateral wall with the solution outlet while the solution flows downward near the front end of the furnace and upward near the rear end of the furnace. This condition maintains the convection force and uniforms the concentration of the solution quickly. With this regenerator, improvement can be made in the response performance of an absorption refrigeration machine to changes in the load of air-conditioning.

BRIEF DESCRIPTION OF THE DRAWINGS

FIG. 8 is a perspective view of another regenerator of prior art.

DETAILED DESCRIPTION OF THE PREFERRED EMBODIMENTS

A preferred embodiment of the present invention is described in detail in the following with reference to FIGS. 1 and 2. For ease of understanding, identical numbers are used for the portions which have the same functions as those of the regenerator previously described in FIGS. 3 through 8.

Figure 1:
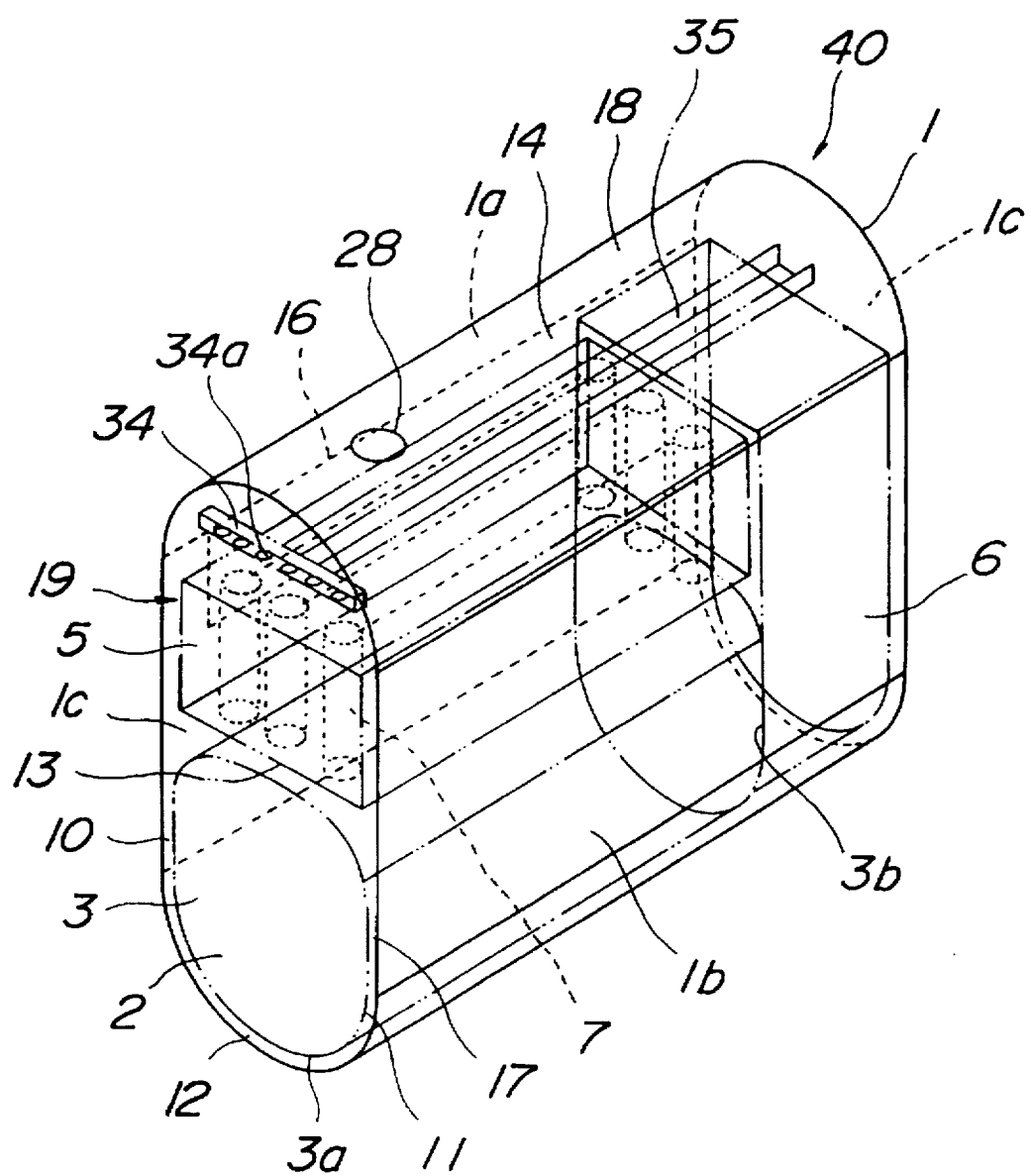
FIG. 1 is a perspective view of an embodiment according to the present invention.
Figure 2:
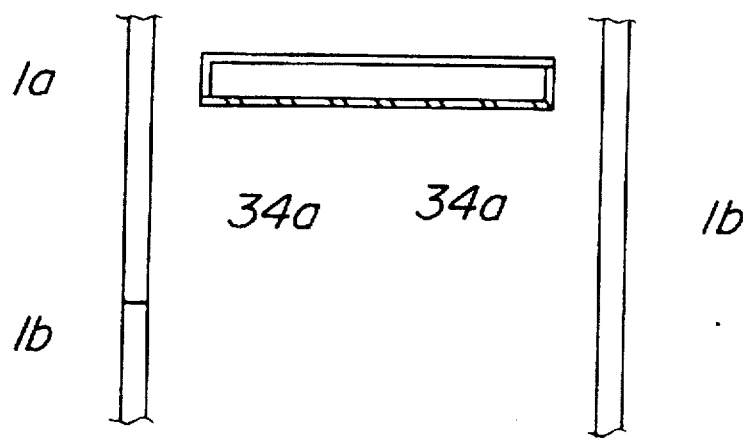
FIGS. 2 are descriptive diagrams showing designs for a spreader.
Figure 2:
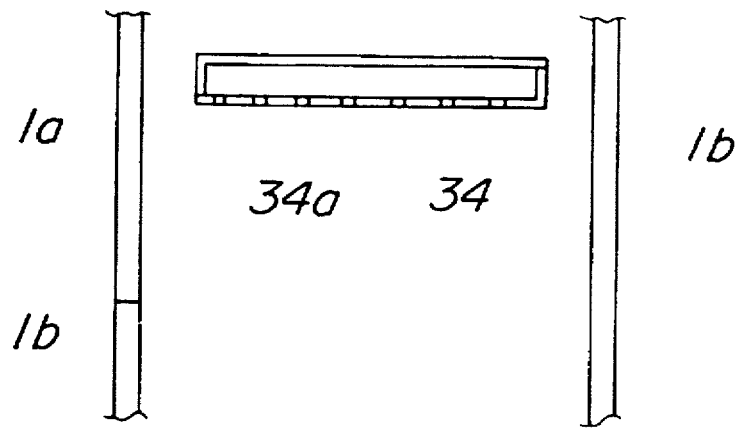
Figure 3:
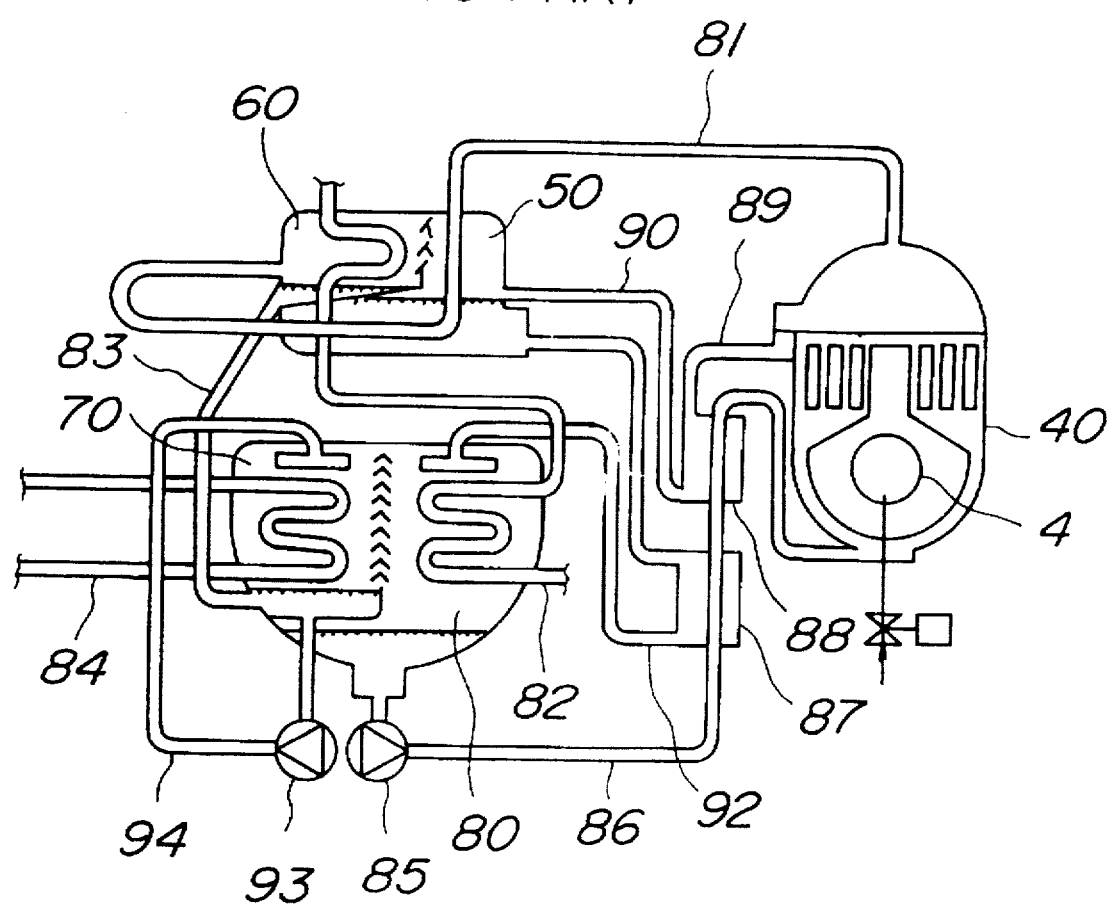
FIG. 3 is a schematic diagram showing the construction of an absorption refrigeration machine.
Figure 4:
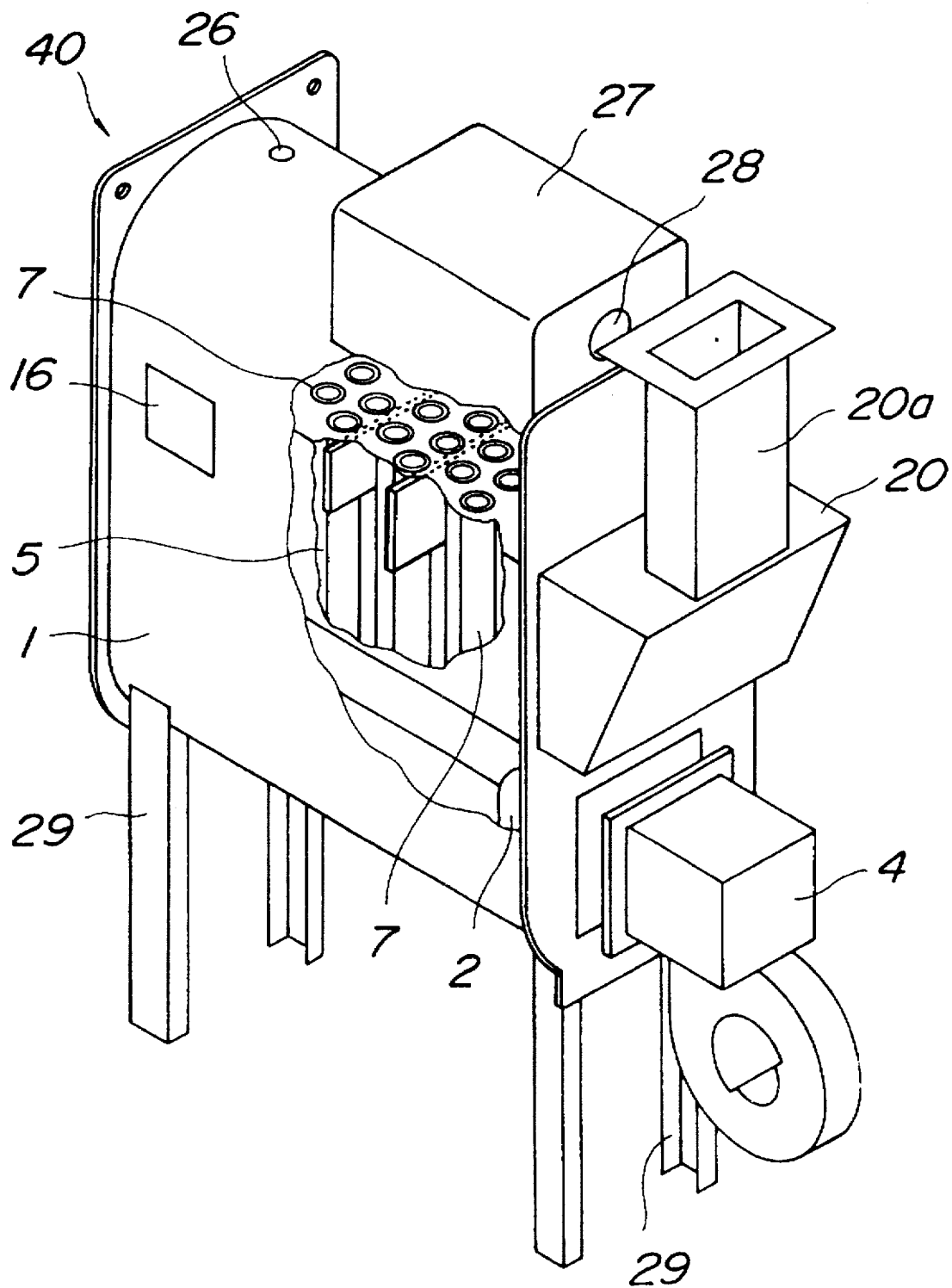
FIG. 4 is a perspective view of a regenerator of prior art, with some inside parts shown by partial removal.
Figure 5:
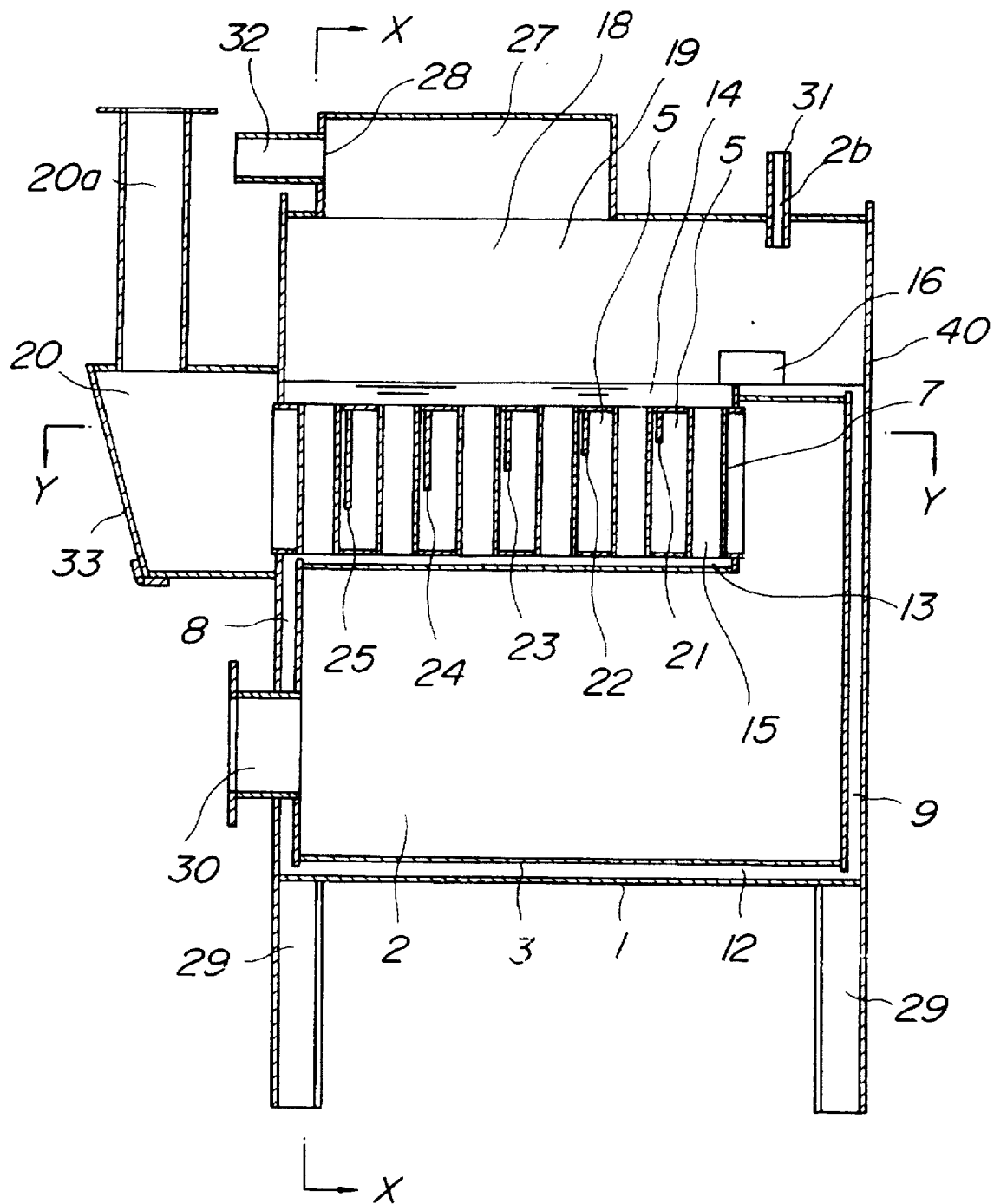
FIG. 5 is a sectional side view of the regenerator shown in FIG. 4.
Figure 6:
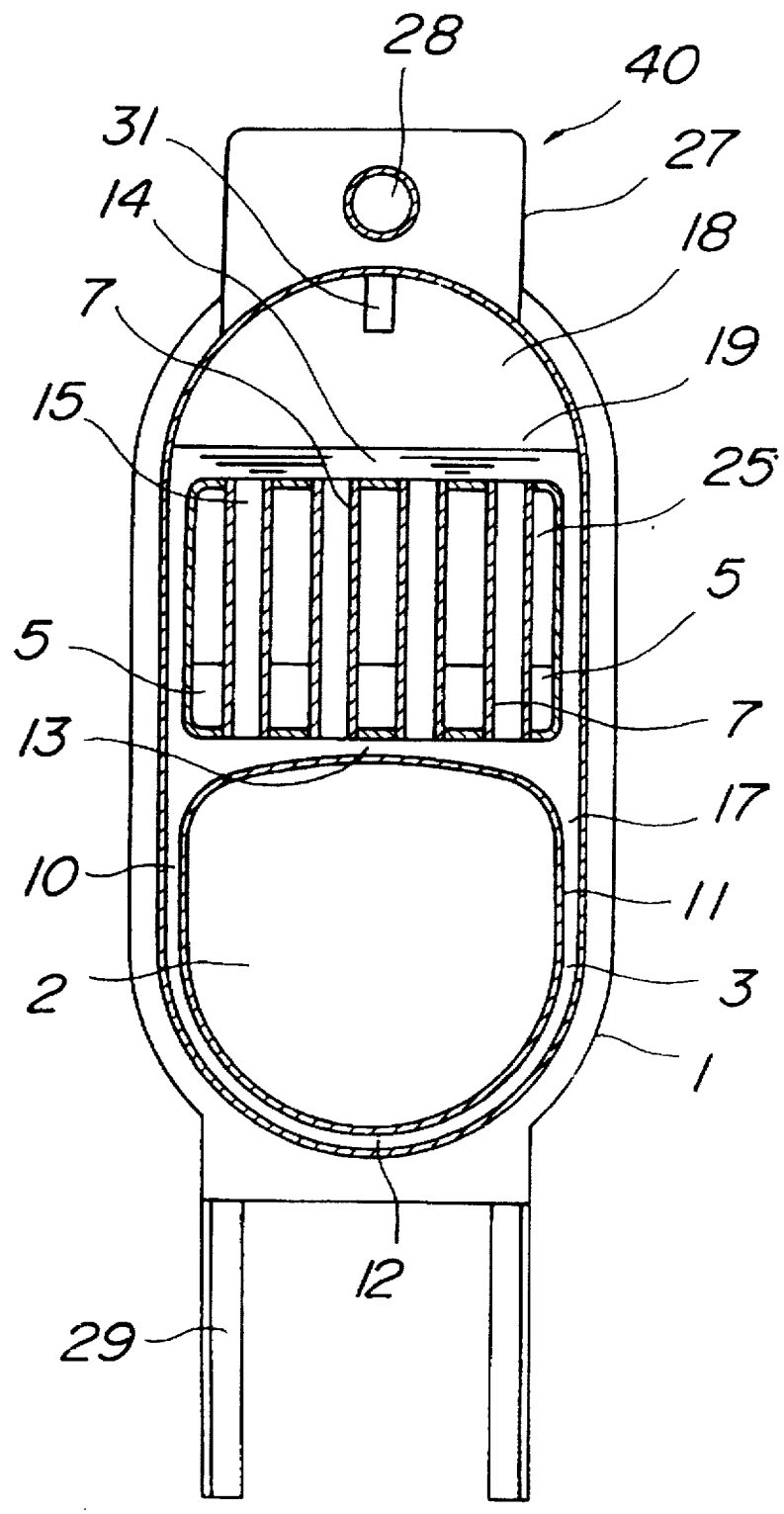
FIG. 6 is a cross-sectional view of the regenerator seen in the direction indicated by arrows X—X.
Figure 7:
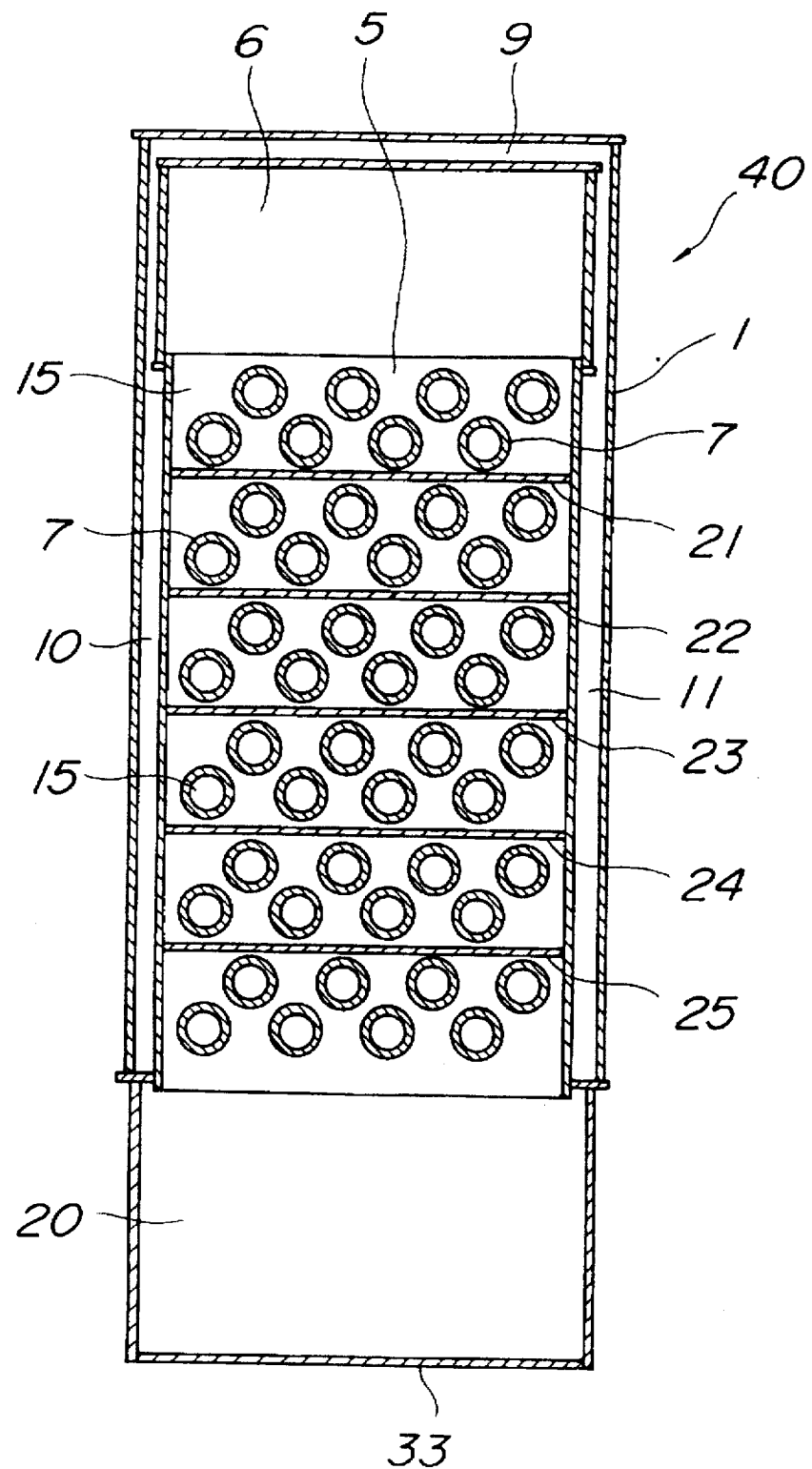
FIG. 7 is a cross-sectional view of the regenerator seen in the direction indicated by arrows Y—Y.

The high-temperature regenerator 40 shown in FIG. 1 has the same construction as the conventional high-temperature regenerator shown in FIGS. 3 through 8 except the construction, position, etc. of the spreader 34.

Therefore, the vessel 1 contains a furnace 3 and an exhaust passage 5. The exhaust passage 5 extends horizontally above the furnace from the rear end 3b of the furnace through a furnace back chamber 6. Inside the vessel 1, defined are a heat-convective region 17, which has a vertical cross section of "U" figure, and an evaporation-separative region 19, which is positioned above and along the heat-convective region. A plurality of solution tubes 7 are provided penetrating the exhaust passage 5 up and down. The solution in the heat-convective region 17 and the evaporation-separative region 19 is fluid freely in the vertical and horizontal directions.

The front end 3a of the furnace 3 is formed in such a way as to allow a burner 4 to be attached. This burner flames in a combustion chamber 2 toward the furnace back chamber 6. The heat generated from the flame and the exhaust gas heats the solution poured into the vessel 1. As a result, the refrigerant evaporates and separates from the solution. The refrigerant which has separated is discharged from a refrigerant outlet 28, which is provided in the upper portion of the vessel 1. The solution with a reduced refrigerant concentration after the evaporation is discharged from a solution outlet 16, which is provided in the lateral wall 1a near the front wall 1c of the vessel.

The spreader 34 used in this embodiment has a flat bottom plate in which openings 34a are provided with a constant diameter and aligned in such a manner that the concentration of the openings is rare at one end, but it increases toward the other end. The side having the rare concentration of the openings is faced to the lateral wall 1a, in which the solution outlet 16 is provided, and the side having the dense concentration of the openings is faced to the lateral wall 1b. The spreader 34 is placed at the position slightly near the front wall 1c from the solution outlet 16, with the bottom plate of the spreader being horizontal. This spreader 34 is provided with supply means 35, which extends parallel to and equidistant from the lateral walls 1a and 1b, so that the solution, which has absorbed the refrigerant at the absorber 80, is supplied to the longitudinally central portion of the spreader by the operation of the absorption pump 85.

When the solution which is sprayed from the spreader 34 and retained in the heat-convective region 17 and the evaporation-separative region 19 is heated in the vessel 1 by the heat generated from the flame of the burner 4 and the heat remaining in the exhaust gas, a strong convection current is generated. In this current, the solution near the furnace back chamber 6 flows upward, and the solution near the front wall 1c flows downward. The reason is that the temperature of the solution is highest near the furnace back chamber 6, which is heated by the flame and the turning exhaust gas, and it is lowest below the spreader 34.

Moreover, the solution is poured more to the side of the lateral wall 1b with no solution outlet than to the side of the lateral wall 1a with the solution outlet 16 while the solution flows downward near the front wall 1c and upward near the rear wall 1c. This condition maintains the convection force and uniforms the concentration of the solution. As a result, with this regenerator, the absorption refrigeration machine is improved in the response performance to changes in the load of air-conditioning.

Furthermore, the spreader 34 may be alternatively formed in such a way that the openings 34a are directed to the lateral wall 1b, which does not have the solution outlet 16, as shown in FIG. 2(a). Moreover, the diameters of the openings may be made relatively small near the lateral wall 1a, which has the solution outlet 16, and relatively large near the lateral wall 1b as shown in FIG. 2(b).

In either case of the above designs for the openings 34a, the openings 34a may be aligned with a constant pitch or with a relatively large pitch near the solution outlet 16 and a relatively small pitch near the opposite side. Also, the openings can be aligned in a plurality of lines. Moreover, the supply means 35 can be positioned far from the solution outlet 16, i.e., near the lateral wall 1b. Also, the spreader 34 can be tilted by positioning the end of the spreader facing the lateral wall 1b slightly lower than the other end facing the lateral wall 1a.

Furthermore, the spreader 34 and the supply means 35 can be made of pipes, and the supply means can be placed vertically descending on the spreader 34.

The invention being thus described, it will be obvious that the same may be varied in many ways. Such variations are not to be regarded as a departure from the spirit and scope of the invention, and all such modifications as would be obvious to one skilled in the art are intended to be included within the scope of the claims.

As described above, the present invention provides improvements to a regenerator which has the following construction. The vessel of the regenerator contains a furnace and an exhaust passage. The furnace extends horizontally, and the exhaust passage extends from an rear end of the furnace horizontally above the furnace. This vessel further includes a plurality of solution tubes, which penetrate the exhaust passage vertically. In this vessel, defined are a heat-convective region with a vertical cross section of "U" figure and an evaporation-separative region, which is located above this heat-convective region. Into the vessel, a solution which has absorbed a refrigerant at an absorber is poured through a spreader, which is provided in an vapor portion of the evaporation-separative region. This solution in the vessel is heated by the flame generated in the furnace and by the exhaust gas discharged through the exhaust passage. As a result, the refrigerant is evaporated and separated from the solution and discharged, and the solution with a reduced refrigerant concentration after the evaporation of the refrigerant is discharged from a solution outlet.

In this regenerator, the spreader is formed to spray one amount of the solution near one lateral wall of the vessel and a different amount of the solution near the other lateral wall of the vessel, and the solution outlet is positioned near the spreader to the side of the rear end of the furnace in the lateral wall whose side the smaller amount of the solution is sprayed to.

In the above regenerator, the spreader is provided with spray openings which are directed to one lateral wall of the vessel, and the solution outlet is positioned near the spreader to the side of the rear end of the furnace in the other lateral wall of the vessel.

In the above regenerator, the spreader is provided with one opening area to the side of one lateral wall of the vessel and a different opening area to side of the other lateral wall of the vessel, and the solution outlet is positioned near the spreader to the side of the rear end of the furnace in the lateral wall whose side the smaller opening of the spreader is located on.

In either above regenerator, the solution flows upward near the rear end of the furnace and downward near the front end of the furnace, whereby a strong convection current is created.

The solution is poured more to the side of the lateral wall with no solution outlet than to the side of the lateral wall with the solution outlet while the solution flows downward near the front end of the furnace and upward near the rear end. This condition maintains the convection force and uniforms the concentration of the solution quickly. As a result, with this regenerator, the absorption refrigeration machine is improved in the response performance to changes in the load of air-conditioning.

What is claimed is:

1. A regenerator comprising:
    a vessel containing a furnace, an exhaust passage and a plurality of solution tubes; said furnace extending horizontally, said exhaust passage extending from an rear end of said furnace horizontally thereabove, and said solution tubes penetrating said exhaust passage vertically; said vessel further including a heat-convective region and an evaporation-separative region, said heat-convective region having a vertical cross section of "U" figure and said evaporation-separative region being above said heat-convective region; and a spreader provided in an vapor portion of said evaporation-separative region, through which a solution having absorbed a refrigerant at an absorber is poured into said vessel, said solution in said vessel being heated by flames generated in said furnace and by exhaust gas discharged through said exhaust passage, thereby said refrigerant being evaporated, separated and discharged from said solution and said solution being discharged with a reduced refrigerant concentration after the evaporation of said refrigerant from a solution outlet;

wherein:
said spreader is formed to spray one amount of said solution to the side of one lateral wall of said vessel and a different amount of said solution to the side of the other lateral wall of said vessel;

said spreader is placed near a front end of said furnace; and said solution outlet is positioned near said spreader to the side of said rear end of said furnace in the lateral wall whose side the smaller amount of said solution is sprayed to.

2. A regenerator comprising:

a vessel containing a furnace, an exhaust passage and a plurality of solution tubes; said furnace extending horizontally, said exhaust passage extending from an rear end of said furnace horizontally thereabove, and said solution tubes penetrating said exhaust passage vertically; said vessel further including a heat-convective region and an evaporation-separative region, said heat-convective region having a vertical cross section of "U" figure and said evaporation-separative region being above said heat-convective region; and a spreader provided in an vapor portion of said evaporation-separative region, through which a solution having absorbed a refrigerant at an absorber is poured into said vessel, said solution in said vessel being heated by flames generated in said furnace and by exhaust gas discharged through said exhaust passage, thereby said refrigerant being evaporated, separated and discharged from said solution and said solution being discharged with a reduced refrigerant concentration after the evaporation of said refrigerant from a solution outlet;

wherein:
said spreader is formed with spray openings directed to one lateral wall of said vessel; and said solution outlet is positioned near said spreader to the side of said rear end of said furnace in the other lateral wall of said vessel.

3. A regenerator comprising:

a vessel containing a furnace, an exhaust passage and a plurality of solution tubes; said furnace extending horizontally, said exhaust passage extending from an rear end of said furnace horizontally thereabove, and said solution tubes penetrating said exhaust passage vertically; said vessel further including a heat-convective region and an evaporation-separative region, said heat-convective region having a vertical cross section of "U" figure and said evaporation-separative region being above said heat-convective region; and a spreader provided in an vapor portion of said evaporation-separative region, through which a solution having absorbed a refrigerant at an absorber is poured into said vessel, said solution in said vessel being heated by flames generated in said furnace and by exhaust gas discharged through said exhaust passage, thereby said refrigerant being evaporated, separated and discharged from said solution and said solution being discharged with a reduced refrigerant concentration after the evaporation of said refrigerant from a solution outlet;

wherein:
said spreader is formed with one opening area to the side of one lateral wall of said vessel and a different opening area to the side of the other lateral wall of said vessel; and said solution outlet is positioned near said spreader to the side of said rear end of said furnace in the lateral wall whose side the smaller opening area of said spreader is positioned to.

* * * * *